(12) United States Patent
Lee et al.

(10) Patent No.: US 8,456,823 B2
(45) Date of Patent: Jun. 4, 2013

(54) DISPLAY

(75) Inventors: Ming-Chang Lee, Tu-Cheng (TW);
Yong-Feng Zhao, Shenzhen (CN);
Hong-Qi Hou, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 114 days.

(21) Appl. No.: 13/082,369

(22) Filed: Apr. 7, 2011

(65) Prior Publication Data

US 2012/0170201 A1 Jul. 5, 2012

(30) Foreign Application Priority Data

Jan. 4, 2011 (CN) .......................... 2011 1 0000314

(51) Int. Cl.
*G06F 1/16* (2006.01)
*H05K 5/00* (2006.01)
*H05K 7/00* (2006.01)

(52) U.S. Cl.
USPC ........................................ 361/679.21; 349/58

(58) Field of Classification Search
USPC ........ 361/679.21–679.3; 349/58–60; 313/582
See application file for complete search history.

(56) References Cited

U.S. PATENT DOCUMENTS

| | | | | |
|---|---|---|---|---|
| 5,583,529 A * | 12/1996 | Satou | ............................. | 345/87 |
| 6,151,207 A * | 11/2000 | Kim | ......................... | 361/679.26 |
| 6,310,767 B1 * | 10/2001 | Spear et al. | ............... | 361/679.24 |
| 6,421,231 B1 * | 7/2002 | Jung | ........................ | 361/679.27 |
| 6,688,576 B2 * | 2/2004 | Oishi et al. | ..................... | 248/317 |
| 6,826,863 B1 * | 12/2004 | Goodfellow | .................... | 40/725 |
| 7,175,242 B2 * | 2/2007 | Lee et al. | ........................ | 312/7.2 |
| 7,236,357 B2 * | 6/2007 | Chen | ........................ | 361/679.55 |
| 7,426,799 B2 * | 9/2008 | Christianson et al. | .......... | 40/725 |
| 7,441,361 B2 * | 10/2008 | Rowan | ............................ | 40/743 |
| 7,471,804 B2 * | 12/2008 | Lee | ................................. | 381/388 |
| 7,558,054 B1 * | 7/2009 | Prest et al. | ................. | 361/679.3 |
| 7,679,889 B2 * | 3/2010 | Sakata | ...................... | 361/679.01 |
| 7,965,039 B2 * | 6/2011 | Watanabe et al. | ............. | 313/582 |
| 8,119,048 B2 * | 2/2012 | Nishimura | .................... | 264/252 |
| 8,199,488 B2 * | 6/2012 | Zou et al. | ................. | 361/679.55 |
| 2001/0002145 A1 * | 5/2001 | Lee et al. | ........................ | 349/58 |
| 2002/0175836 A1 * | 11/2002 | Roberts | ............................ | 341/34 |
| 2003/0223020 A1 * | 12/2003 | Lee | ................................. | 349/58 |
| 2003/0223187 A1 * | 12/2003 | Tsao et al. | ...................... | 361/681 |
| 2005/0285990 A1 * | 12/2005 | Havelka et al. | ................. | 349/58 |
| 2006/0028790 A1 * | 2/2006 | Baek | ............................ | 361/681 |
| 2006/0055839 A1 * | 3/2006 | Hirao et al. | ...................... | 349/58 |
| 2006/0146486 A1 * | 7/2006 | Wikstrom et al. | ............. | 361/681 |
| 2006/0279924 A1 * | 12/2006 | Richardson et al. | .......... | 361/683 |
| 2008/0247127 A1 * | 10/2008 | Finnegan | ...................... | 361/681 |
| 2009/0049773 A1 * | 2/2009 | Zadesky et al. | ............. | 52/204.62 |
| 2010/0014232 A1 * | 1/2010 | Nishimura | ................. | 361/679.3 |
| 2010/0061040 A1 * | 3/2010 | Dabov et al. | ............. | 361/679.01 |
| 2011/0242445 A1 * | 10/2011 | Bo et al. | ........................... | 349/58 |

* cited by examiner

*Primary Examiner* — Adrian S Wilson
(74) *Attorney, Agent, or Firm* — Altis Law Group, Inc.

(57) ABSTRACT

A display includes a seat, a protecting member, and a resisting member. Opposite ends of the protecting member are respectively received in the slide slots defined in the opposite ends of the seat. A front side of the protecting member is received in the slide slot defined in the front side of the seat. The resisting member is mounted to a rear side of the seat, to resist against a rear side of the protecting member.

9 Claims, 3 Drawing Sheets

DISPLAY

BACKGROUND

1. Technical Field

The present disclosure relates to a display.

2. Description of Related Art

Generally speaking, a display of a notebook computer includes a transparent protective layer covering a liquid crystal display panel. The glass is mounted by glue to an outer frame accommodating the liquid crystal display panel of the notebook computer with glue. However, in assembly, the glue needs a long time to dry, which is inconvenient and slows the assembly process. Furthermore, to disassemble the protective glass if needed during repairs is not easy.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
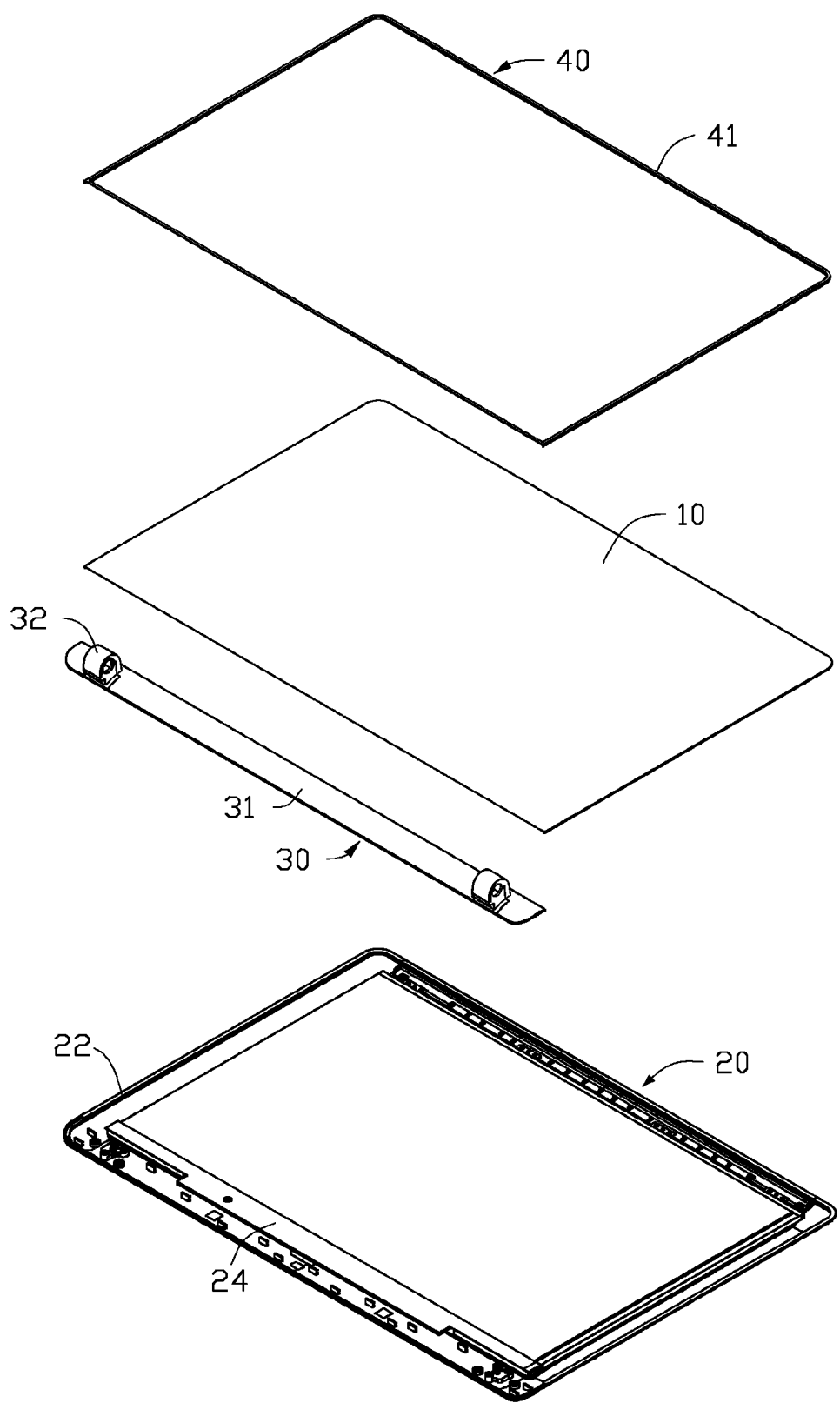
FIG. 1 is an exploded, isometric view of an exemplary embodiment of a display.
Figure 2:
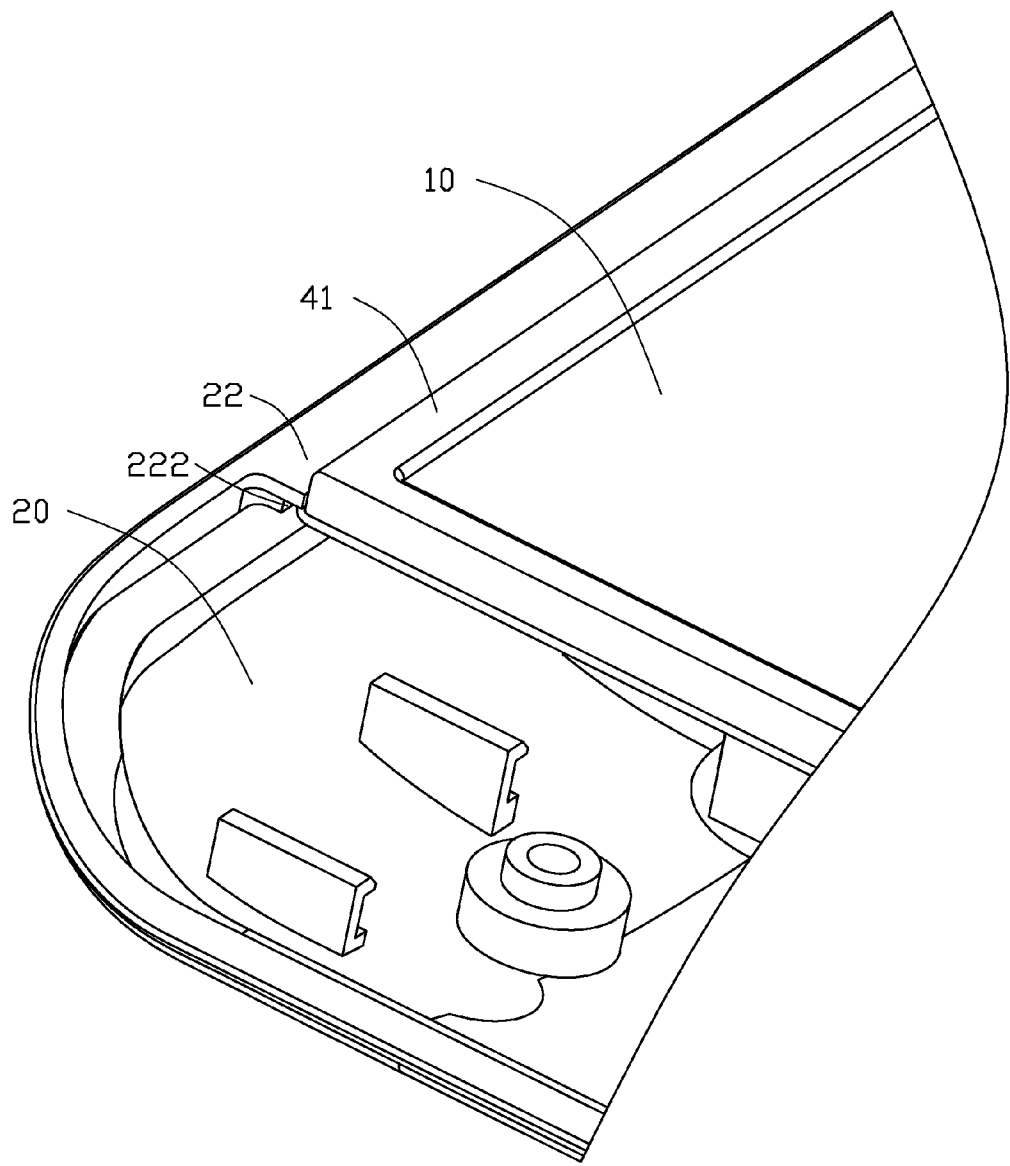
FIG. 2 is a cutaway, partially assembled view of FIG. 1.
Figure 3:
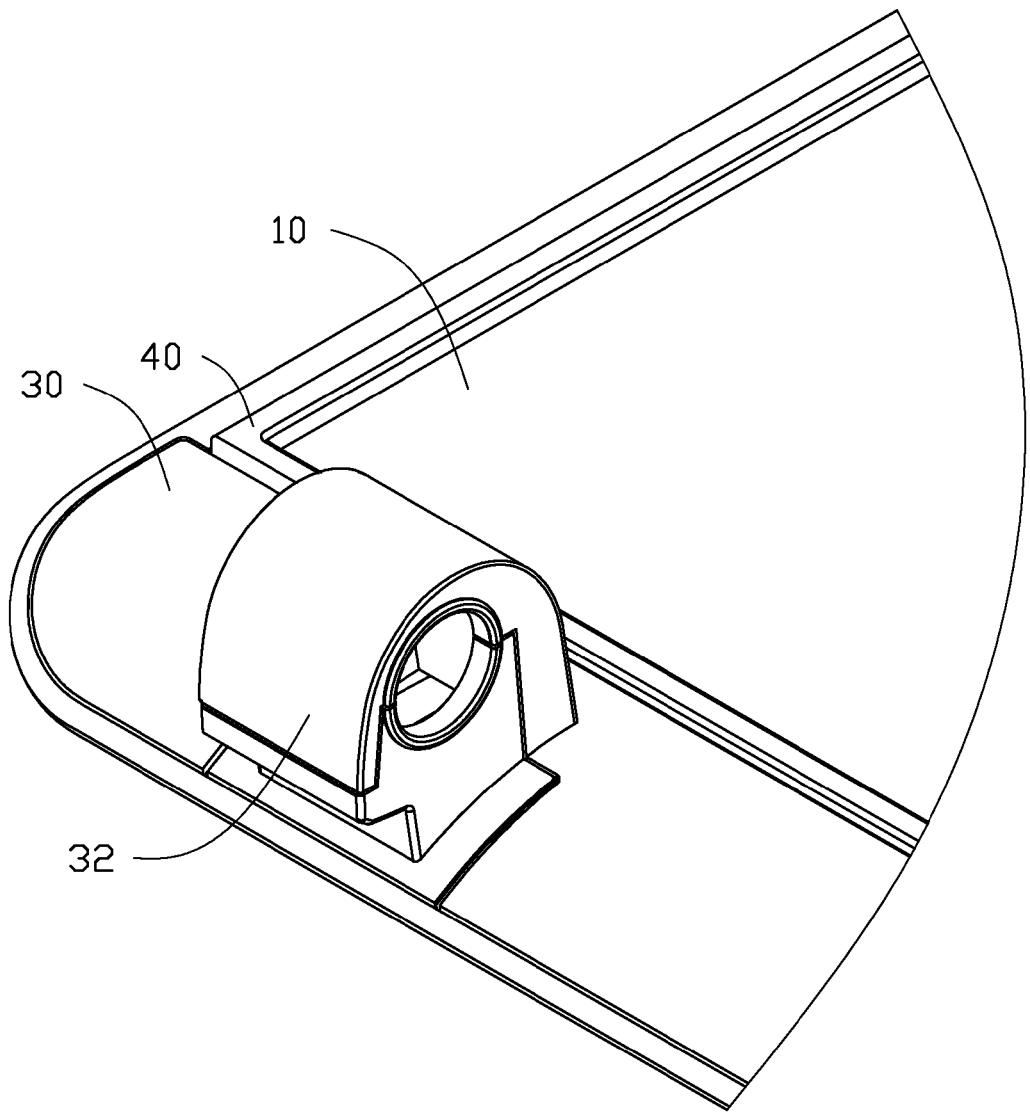
FIG. 3 is a cutaway, assembled view of FIG. 1.

Referring to FIGS. 1 to 3, an exemplary embodiment of a display includes a protecting member 10, a seat 20, a resisting member 30, and a frame 40.

The protecting member 10 is a transparent protective layer. In this embodiment, the protecting member 10 is a plate made of glass.

The seat 20 is used to install display units (not shown), such as a liquid crystal display (LCD) panel and a back light module. A flange 22 protrudes from each of two opposite ends and a front side of the seat 20. A slide slot 222 (shown in FIG. 2) is defined between each flange 22 and the seat 20. A support 24 extends from a rear side of the seat 20.

The resisting member 30 is mounted to the rear side of the seat 20, and includes a substantially bar-shaped main body 31, and two pivot portions 32 extending from two opposite ends of the main body 31. A hinge (not shown) is pivotably mounted to each pivot portion 32.

The frame 40 is substantially rectangular and made of plastic. The frame 40 includes four pressing blocks 41 in opposite ends, and front and rear sides. The four pressing blocks 41 are head-to-tail connected together.

Referring to FIGS. 2 and 3, in assembly, the protecting member 10 is slid into the seat 20 from the rear side of the seat 20. Opposite sides of the protecting member 10 are slidably received in the corresponding slide slots 222 of the seat 20. The protecting member 10 is moved forward further, until a front side of the protecting member 10 is received in the slide slot 222 in the front side of the seat 20. A rear side of the protecting member 10 is supported on the support 24 of the seat 20. Thus, protecting member 10 is mounted to the seat 20 and is placed above the display units. The frame 40 is placed on the protecting member 10. Three pressing blocks 41 respectively resist against a corresponding one of the flanges 22 to mount the frame 40 to the seat 20. The main body 31 of the resisting member 30 is mounted to the rear side of the seat 20, adjacent to the support 24 to resist against the rear side of the protecting member 10. The main body 31 can prevent the protecting member 10 from sliding off from the seat 20.

It is to be understood, however, that even though numerous characteristics and advantages of the embodiments have been set forth in the foregoing description, together with details of the structure and function of the embodiments, the present disclosure is illustrative only, and changes may be made in details, especially in matters of shape, size, and arrangement of parts within the principles of the embodiments to the full extent indicated by the broad general meaning of the terms in which the appended claims are expressed.

The invention claimed is:

1. A display comprising:
    a seat defining three slide slots in opposite ends and a front side of the seat;
    a protecting member slid into the slide slots of the seat from a rear side of the seat, wherein opposite ends of the protecting member are respectively received in the slide slots defined in the opposite ends of the seat, and a front side of the protecting member is received in the slide slot defined in the front side of the seat; and
    a resisting member mounted to the rear side of the seat, to resist against a rear side of the protecting member.

2. The display of claim 1, wherein a flange protrudes from each of the opposite ends and the front side of the seat, the slide slots are defined between the flanges and the seat.

3. The display of claim 2, further comprising a frame, wherein the frame is place on the protecting member, and comprises four pressing blocks in opposite ends, and front and rear sides of the frame, and head-to-tail connected together, three pressing blocks respectively resist against a corresponding one of the flanges to mount the frame to the seat.

4. The display of claim 3, wherein a support extends from a rear side of the seat to support a rear side of the protecting member.

5. The display of claim 1, wherein a support extends from a rear side of the seat to support a rear side of the protecting member.

6. The display of claim 1, wherein the protecting member is transparent.

7. The display of claim 6, wherein the protective member is made of glass.

8. The display of claim 1, wherein the resisting member is mounted to prevent the protecting member from sliding off from the rear side of the seat.

9. The display of claim 1, wherein the resisting member is mounted to close the slide slots defined in the opposite ends of the seat.

* * * * *